(12) United States Patent
Durairaj

(10) Patent No.: US 12,229,050 B2
(45) Date of Patent: Feb. 18, 2025

(54) ON-DEMAND SCANNING FOR CHANGES IN CLOUD OBJECT STORAGE SYSTEMS

(71) Applicant: Capital One Services, LLC, McLean, VA (US)

(72) Inventor: Rajesh Kanna Durairaj, Plano, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/582,527

(22) Filed: Feb. 20, 2024

(65) Prior Publication Data

US 2024/0193086 A1 Jun. 13, 2024

Related U.S. Application Data

(63) Continuation of application No. 17/543,941, filed on Dec. 7, 2021, now Pat. No. 11,934,312.

(51) Int. Cl.
*G06F 12/0815* (2016.01)
*G06F 9/50* (2006.01)
*G06F 16/901* (2019.01)

(52) U.S. Cl.
CPC ........ *G06F 12/0815* (2013.01); *G06F 9/5072* (2013.01); *G06F 16/9017* (2019.01); *G06F 16/9027* (2019.01)

(58) Field of Classification Search
None
See application file for complete search history.

(56) References Cited

U.S. PATENT DOCUMENTS

| | | | |
|---|---|---|---|
| 9,460,405 B2 | 10/2016 | Vijayan et al. | |
| 9,646,022 B2 | 5/2017 | Lin et al. | |
| 10,133,866 B1 | 11/2018 | Kumar et al. | |
| 11,468,087 B1 | 10/2022 | Slember et al. | |
| 2012/0089569 A1 | 4/2012 | Mason, Jr. et al. | |
| 2014/0059217 A1 | 2/2014 | Pizurica | |
| 2017/0329789 A1* | 11/2017 | Hanusiak | G06F 16/11 |
| 2017/0372070 A1 | 12/2017 | Burdett et al. | |
| 2018/0210793 A1* | 7/2018 | Mamluk | G06F 11/2094 |
| 2018/0357294 A1 | 12/2018 | Zhang | |
| 2019/0370116 A1 | 12/2019 | Jacob | |
| 2019/0370353 A1 | 12/2019 | Doddameti et al. | |
| 2021/0342331 A1 | 11/2021 | Saba et al. | |
| 2023/0132830 A1 | 5/2023 | Marivoet et al. | |
| 2023/0176970 A1 | 6/2023 | Durairaj | |

* cited by examiner

*Primary Examiner* — Kaushikkumar M Patel
(74) *Attorney, Agent, or Firm* — Sterne, Kessler, Goldstein & Fox P.L.L.C.

(57) ABSTRACT

Embodiments disclosed are directed to a computing system that provides for on-demand scanning for changes in cloud-based object storage systems. The changes can include modifications, additions, or deletions of objects stored in a cloud-based object storage system. The computing system scans, at a first runtime, objects stored in a cloud-based object storage system. The computing system retrieves lookup information associated with a second runtime of a previous scan. Based on the lookup information, the computing system identifies a subset of the objects that were changed or added after the second runtime and before the first runtime. Subsequently, the computing system generates an electronic notification including a consolidated list of the subset of the objects.

20 Claims, 4 Drawing Sheets

ON-DEMAND SCANNING FOR CHANGES IN CLOUD OBJECT STORAGE SYSTEMS

CROSS REFERENCE TO RELATED APPLICATIONS

This application claims the benefit of U.S. patent application Ser. No. 17/543,941, filed Dec. 7, 2021, the disclosure of which is incorporated by reference in its entirety.

TECHNICAL FIELD

Embodiments relate to cloud-based object storage systems, specifically a system that performs on-demand scanning to identify changes in objects stored in cloud-based object storage systems.

BACKGROUND

The promulgation of cloud-based computing services has led to a rise in various types of data being stored in the cloud. In one example, Simple Storage Service (S3) is a service offered by Amazon Web Services (AWS)™ to store a wide variety of objects (e.g., images, logs, etc.) in cloud-based buckets or directories. Each time an object is added, updated, or deleted, S3 creates a separate, object-level notification (e.g., electronic message) and sends the notification in near real time to one or more corresponding applications, users, or cloud-based queueing systems. For example, the same object may be updated multiple times, triggering a separate notification each time the object is updated. In another example, an object may be added, updated multiple times, and then deleted, also triggering a separate notification when the object is added, each time the object is updated, and again when the object is deleted.

However, for batch-based applications running at a cadence (daily, weekly, or monthly), processing these notifications is both ineffective and inefficient. For instance, applications relying on these notifications will have to process multiple duplicate notifications for objects that have been updated multiple times since the last processing even when, from an application perspective, there has been only one or no change. Additionally, because these notifications can only be configured at the bucket or directory level, applications have to process irrelevant notifications for objects at subdirectories that are not of interest to the applications.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the art to make and use the embodiments.

DETAILED DESCRIPTION

Figure 1:
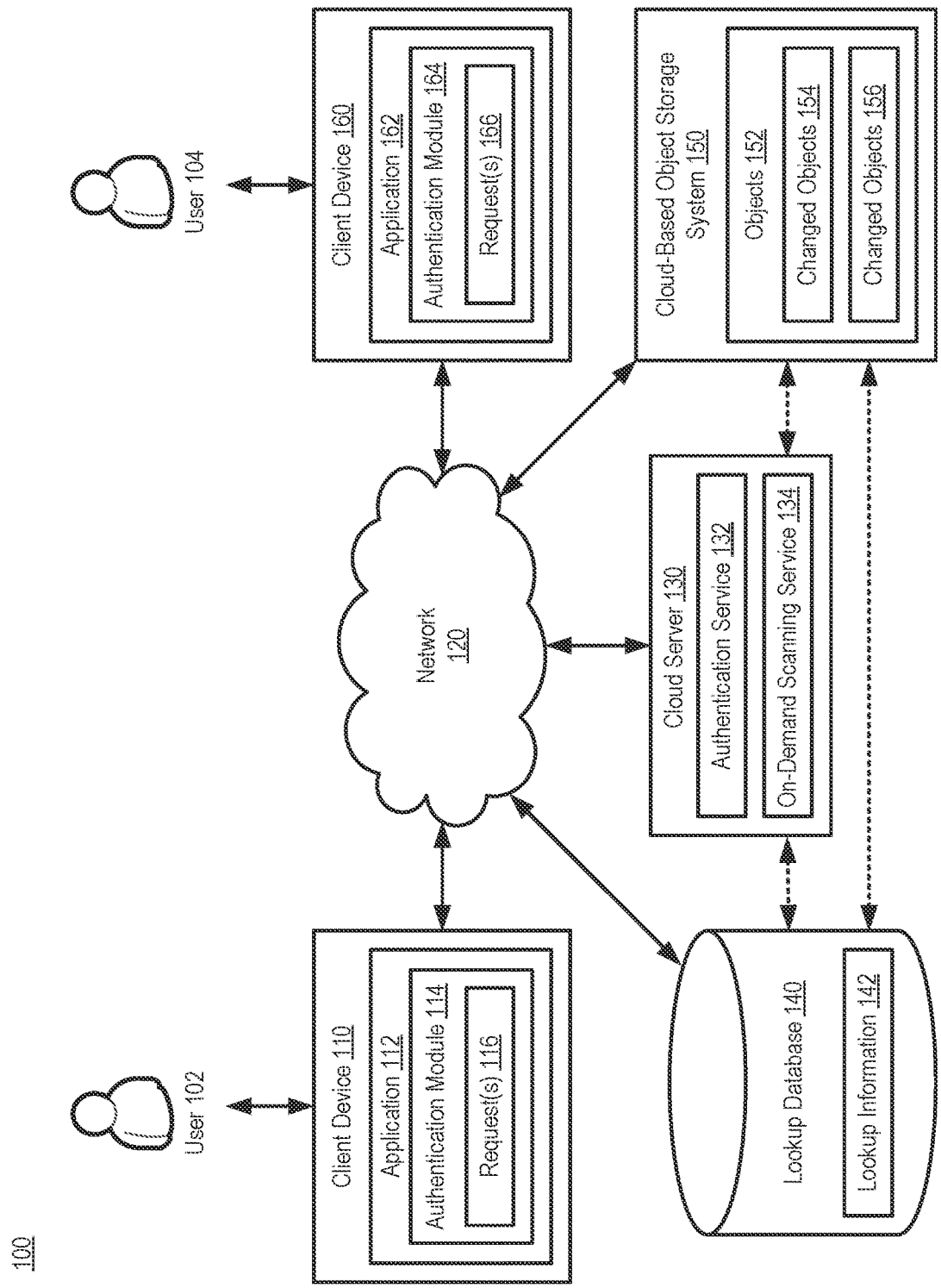
FIG. 1 illustrates an example system for providing on-demand scanning of objects stored in a cloud-based object storage system according to some embodiments.

Embodiments disclosed herein relate to systems and methods for providing on-demand scanning for changes in cloud-based object storage systems since the last scanning run. The changes can include, but are not limited to, (i) modifications of objects stored in cloud-based object storage systems and (ii) additions of objects to cloud-based object storage systems. The cloud-based object storage systems can include, but are not limited to, Amazon S3, any other suitable cloud-based object storage system, or any combination thereof.

In several embodiments, the present disclosure provides for an on-demand scanning system that uses an on-demand cloud-based object storage change scanner to perform scans at runtime for changes in objects stored in a cloud-based object storage system and generate a consolidated notification for only those objects that were added or changed since the last run. To do so, the on-demand cloud-based object storage change scanner utilizes lookup data obtained from a file-based, memory-based, or database-based lookup system where the maximum timestamp for the last scan is stored. The on-demand cloud-based object storage change scanner uses this lookup information to discard objects that were not updated after the captured time. The on-demand object storage change scanner then produces a consolidated list of objects that were added or changed since the last scan.

In several embodiments, the lookup system can store the timestamp information either at a root level (e.g., top-level directory) or at a leaf level (e.g., sub-directory or key level) of a tree-based structure of the cloud-based object storage system. As a result, the on-demand cloud-based object storage change scanner can provide for independently scanning at a root level or at a leaf level to increase the efficiency and effectiveness of the scanning technique.

The following embodiments are described in sufficient detail to enable those skilled in the art to make and use the disclosure. It is to be understood that other embodiments are evident based on the present disclosure, and that system, process, or mechanical changes may be made without departing from the scope of an embodiment of the present disclosure.

In the following description, numerous specific details are given to provide a thorough understanding of the disclosure. However, it will be apparent that the disclosure may be practiced without these specific details. In order to avoid obscuring an embodiment of the present disclosure, some circuits, system configurations, architectures, and process steps are not disclosed in detail.

The drawings showing embodiments of the system are semi-diagrammatic, and not to scale. Some of the dimensions are for the clarity of presentation and are shown exaggerated in the drawing figures. Similarly, although the views in the drawings are for ease of description and generally show similar orientations, this depiction in the figures is arbitrary for the most part. Generally, the disclosure may be operated in any orientation.

The term "module" or "unit" referred to herein may include software, hardware, or a combination thereof in an embodiment of the present disclosure in accordance with the context in which the term is used. The software can include, for example, machine code, firmware, embedded code, or application software. The hardware can include, for example, hardware circuitry, a processor, a special purpose computer, an integrated circuit, integrated circuit cores, or a combination thereof. Further, if a module or unit is included in the system or apparatus claim section below, the module or unit is deemed to include hardware circuitry for the purposes and the scope of the system or apparatus claims.

The term "service" or "services" referred to herein can include a collection of modules or units. A collection of modules or units may be arranged, for example, in software or hardware libraries or development kits in embodiments of the present disclosure in accordance with the context in which the term is used. For example, the software or hardware libraries and development kits may be a suite of data and programming code, for example pre-written code, classes, routines, procedures, scripts, configuration data, or a combination thereof, that may be called directly or through an application programming interface (API) to facilitate the execution of functions of the system.

The modules, units, or services in the following description of the embodiments may be coupled to one another as described or as shown. The coupling may be direct or indirect, without or with intervening items between coupled modules, units, or services. The coupling may be by physical contact or by communication between modules, units, or services.

FIG. 1 illustrates a system 100 for providing on-demand scanning for changes in objects stored in a cloud-based object storage system according to some embodiments. In several embodiments, the system 100 can include a client device 110 associated with a user 102, a client device 160 associated with a user 104, a network 120, a cloud server 130, a lookup database 140, and a cloud-based object storage system 150. In several embodiments, the client device 110 can include an application 112 that includes an authentication module 114 having access to device attributes for the client device 110. In several embodiments, the client device 160 can include an application 162 that includes an authentication module 164 having access to device attributes for the client device 160. In several embodiments, the cloud server 130 can include an authentication service 132 and an on-demand scanning service 134.

The client device 110 and the client device 160 may be any of a variety of centralized or decentralized computing devices. For example, one or both of the client device 110 and the client device 160 may be a mobile device, a laptop computer, a desktop computer, or a point-of-sale (POS) device. In several embodiments, one or both of the client device 110 and the client device 160 can function as a stand-alone device separate from other devices of the system 100. The term "stand-alone" can refer to a device being able to work and operate independently of other devices. In several embodiments, the client device 110 and the client device 160 can store and execute the application 112 and the application 162, respectively.

Each of the application 112 and the application 162 may refer to a discrete software that provides some specific functionality. For example, the application 112 may be a mobile application that allows the user 102 to perform some functionality, whereas the application 162 may be a mobile application that allows the user 104 to perform some functionality. The functionality can allow the user 102, the user 104, or both to perform cloud-based object storage operations such as displaying electronic notifications received from the on-demand scanning service 134 and adding, modifying (e.g., revising, moving, replacing, etc.), or deleting objects stored in the cloud-based object storage system 150. In other embodiments, one or more of the application 112 and the application 162 may be a desktop application that allows the user 102 or the user 104 to perform these or any other suitable functionalities.

In several embodiments, the client device 110 and the client device 160 can be coupled to the cloud server 130 via the network 120. The cloud server 130 may be part of a backend computing infrastructure, including a server infrastructure of a company or institution, to which the application 112 and the application 162 belong. Although the cloud server 130 is shown as a single component in FIG. 1, the cloud server 130 can include a variety of centralized or decentralized computing devices. For example, the cloud server 130 may include a mobile device, a laptop computer, a desktop computer, grid-computing resources, a virtualized computing resource, cloud computing resources, peer-to-peer distributed computing devices, a server farm, or a combination thereof. The cloud server 130 may be centralized in a single room, distributed across different rooms, distributed across different geographical locations, or embedded within the network 120. While the devices comprising the cloud server 130 can couple with the network 120 to communicate with the client device 110 and the client device 160, the devices of the cloud server 130 can also function as stand-alone devices separate from other devices of the system 100.

In several embodiments, if the cloud server 130 can be implemented using cloud computing resources of a public or private cloud. Examples of a public cloud include, without limitation, Amazon Web Services (AWS)™, IBM Cloud™, Oracle Cloud Solutions™, Microsoft Azure Cloud™, and Google Cloud™. A private cloud refers to a cloud environment similar to a public cloud with the exception that it is operated solely for a single organization.

In several embodiments, the cloud server 130 can couple to the client device 110 to allow the application 112 to function. For example, in several embodiments, both the client device 110 and the cloud server 130 can have at least a portion of the application 112 installed thereon as instructions on a non-transitory computer readable medium. The client device 110 and the cloud server 130 can both execute portions of the application 112 using client-server architectures, to allow the application 112 to function.

In several embodiments, the cloud server 130 can couple to the client device 160 to allow the application 162 to function. For example, in several embodiments, both the client device 160 and the cloud server 130 can have at least a portion of the application 162 installed thereon as instructions on a non-transitory computer readable medium. The client device 160 and the cloud server 130 can both execute portions of the application 162 using client-server architectures, to allow the application 162 to function.

In several embodiments, the cloud server 130 can transmit requests and other data to, and receive one or more requests 116, indications, device attributes, and other data from, the authentication module 114 (and in effect the client device 110) via the network 120. In several embodiments, the cloud server 130 can transmit requests and other data to, and receive one or more requests 116, indications, device attributes, and other data from, the authentication module 164 (and in effect the client device 160) via the network 120.

The network 120 refers to a telecommunications network, such as a wired or wireless network. The network 120 can span and represent a variety of networks and network topologies. For example, the network 120 can include wireless communications, wired communications, optical communications, ultrasonic communications, or a combination thereof. For example, satellite communications, cellular communications, Bluetooth, Infrared Data Association standard (IrDA), wireless fidelity (Wi-Fi), and worldwide interoperability for microwave access (WiMAX) are examples of wireless communications that may be included in the network 120. Cable, Ethernet, digital subscriber line (DSL), fiber optic lines, fiber to the home (FTTH), and plain old telephone service (POTS) are examples of wired communications that may be included in the network 120. Further, the network 120 can traverse a number of topologies and distances. For example, the network 120 can include a direct connection, personal area network (PAN), local area network (LAN), metropolitan area network (MAN), wide area network (WAN), or a combination thereof. For illustrative purposes, in the embodiment of FIG. 1, the system 100 is shown with the client device 110, the client device 160, and the cloud server 130 as end points of the network 120. This, however, is an example and it is to be understood that the system 100 can have a different partition between the client device 110, the client device 160, the cloud server 130, and the network 120. For example, the client device 110, the client device 160, and the cloud server 130 can also function as part of the network 120.

In several embodiments, the client device 110 and the client device 160 can include at least the authentication module 114 and the authentication module 164, respectively. In several embodiments, each of the authentication module 114 and the authentication module 164 may be a module of the application 112 and the application 162, respectively. In several embodiments, the authentication module 114 and the authentication module 164 can enable the client device 110 and the client device 160, respectively, and/or the application 112 and the application 162, respectively, to receive requests and other data from, and transmit requests, device attributes, indications, and other data to, the authentication service 132, the on-demand scanning service 134, and/or the cloud server 130 via the network 120. In several embodiments, this may be done by having the authentication module 114 and the authentication module 164 couple to the authentication service 132 and/or the on-demand scanning service 134 via an API to transmit and receive data as a variable or parameter.

In several embodiments, the cloud server 130 can include at least the authentication service 132 and the on-demand scanning service 134. In several embodiments, each of the authentication service 132 and the on-demand scanning service 134 may be implemented as a respective software application, or suite of software applications, on the cloud server 130. In several embodiments, the authentication service 132 can enable receipt of electronic information from the authentication module 114 and the authentication module 164. This may be done, for example, by having the authentication service 132 couple to the authentication module 114 and the authentication module 164 via a respective API to receive the electronic information as a variable or parameter, which, in some aspects, the authentication service 132 can then transmit to the on-demand scanning service 134. In several embodiments, each of the authentication service 132 and the on-demand scanning service 134 can further enable storage of the electronic information in a local storage device or transmission (e.g., directly, or indirectly via the network 120) of the electronic information to the lookup database 140, the cloud-based object storage system 150, or both for storage and retrieval.

The lookup database 140 may be a database or repository used to store lookup information 142 associated with the objects 152 stored in the cloud-based object storage system 150. For example, the lookup database 140 can store, in a list or as table entries, timestamp information (e.g., a maximum timestamp) for each scan performed by the on-demand scanning service 134 on the objects 152 stored in the cloud-based object storage system 150 as the lookup information 142. In another example, the lookup information 142 can include first timestamp information for scans performed on the subset of the objects 152 that are stored at the root level of the tree-based structure in the cloud-based object storage system 150, second timestamp information for scans performed on the subset of the objects 152 that are stored at the leaf level of the tree-based structure in the cloud-based object storage system 150, or both.

In several embodiments, the lookup information 142 can include, for example, file-based lookup information generated by a file-based lookup system, cache memory-based lookup information generated by a cache memory-based lookup system, database-based lookup information generated by a database-based lookup system, any other suitable data or electronic information, or any combination thereof. File-based lookup systems can include, for example, text files, comma-separated values (CSV) files, and SQLite™ database files. Cache memory-based lookup systems can include, for example, any suitable cache-based system such as Redis™ and Memcached. Database-based lookup systems can include, for example, SQL-based relational databases such as PostgreSQL™, Microsoft SQL Server™, and Amazon Aurora™. In another example, database lookup systems can include No-SQL databases such as MongoDB™ and Cassandra™.

In several embodiments, the selection of the lookup system can determine the performance of the identification process and, as a result, have an impact on the run time of the scanning process. The identification process can include fetching data from the lookup system for each object that is being scanned. File-based lookup systems can involve many I/O operations and thus may be relatively slower than cache memory-based lookup systems and database-based lookup systems for cases where the volume of scanned objects is large. Database-based lookup systems can be optimized for read operations and thus, in some aspects, may be better in performance compared to file-based lookup systems. By design, cache memory-based lookup systems may be optimized for faster reads and thus can provide a better performance compared to database-based lookup systems.

The cloud-based object storage system 150 may be a database or repository used to store objects 152, information associated with the objects 152, any other suitable data, or any combination thereof. The cloud-based object storage system 150 can store the objects 152 in a tree-based structure that includes one or more buckets at one or more root levels of the tree-based structure, and one or more objects stored in each bucket at one or more leaf levels of the tree-based structure. For example, the cloud-based object storage system 150 can store some of the objects 152 at a root level (e.g., a bucket level) of the tree-based structure in the cloud-based object storage system 150, while storing others of the objects 152 at a leaf level (e.g., an object level) of the tree-based structure in the cloud-based object storage system 150. In several embodiments, one or more folders (including folders within folders) can be disposed within each bucket, and one or more objects can be disposed within each folder. In one illustrative and non-limiting example, the cloud-based object storage system 150 can be implemented in S3.

In a variety of embodiments, the on-demand scanning service 134 of the cloud server 130 can provide on-demand scanning for changes in the objects 152 stored in the cloud-based object storage system 150. For example, the on-demand scanning service 134 can begin by scanning, at a first runtime, the objects 152 stored in the cloud-based object storage system 150. For example, the on-demand scanning service 134 can scan, at the first runtime, a subset of the objects 152 that are stored at a root level of a tree-based structure in the cloud-based object storage system 150. In another example, the on-demand scanning service 134 can scan, at the first runtime, a subset of the objects 152 that are stored at a leaf level of the tree-based structure in the cloud-based object storage system 150.

The on-demand scanning service 134 can then retrieve the lookup information 142 associated with a second runtime of a previous scan (e.g., the last scan that was run before the first runtime). For example, the on-demand scanning service 134 can retrieve the lookup information 142 for the subset of the objects 152 that are stored at the root level of the tree-based structure in the cloud-based object storage system 150. In another example, the on-demand scanning service 134 can retrieve the lookup information 142 for the subset of the objects 152 that are stored at the leaf level of the tree-based structure in the cloud-based object storage system 150.

Next, the on-demand scanning service 134 can identify changed objects 154 based on the lookup information 142. The changed objects 154 can include a subset of the objects 152 that were modified or added after the second runtime and before the first runtime. For example, the changed objects 154 can include, but are not limited to, (i) a subset of the objects 152 that have been modified since the previous scan (e.g., referred to herein as "newly-changed objects") and (ii) a subset of the objects 152 that have been added but not deleted since the previous scan (e.g., referred to herein as "newly-added objects"). In another example, the lookup information 142 can include a maximum timestamp of the second runtime of the previous scan, and the changed objects 154 can include a subset of the objects 152 that were changed (e.g. modified or added) after the maximum timestamp of the previous scan.

Additionally, the on-demand scanning service 134 can identify changed objects 156 based on the lookup information 142. The changed objects 156 can include a subset of the objects 152 that were modified or added before, but not after, the second runtime or deleted after the second runtime. For example, the changed objects 156 can include, but are not limited to, (i) a subset of the objects 152 that were modified before the previous scan but have not been modified or deleted since the previous scan (e.g., referred to herein as "previously-changed objects"), (ii) a subset of the objects 152 that were added before the previous scan but have not been modified or deleted since the previous scan (e.g., referred to herein as "unchanged objects"), and (iii) a subset of the objects 152 that were deleted after the previous scan but have not been undeleted, re-added, or otherwise restored thereafter (e.g., referred to herein as "newly-deleted objects").

Subsequently, the on-demand scanning service 134 can generate an electronic notification (e.g., an electronic alert, message, or report) comprising a consolidated list of the changed objects 154 (e.g., newly changed objects and newly added objects) that does not include any of the changed objects 156 (e.g., previously changed objects, unchanged objects, and newly deleted objects). For example, the on-demand scanning service 134 can generate an electronic notification comprising a first consolidated list that includes both the changed objects 154 and the changed objects 156. The on-demand scanning service 134 can then discard the electronic notification data for the changed objects 156 to generate a second consolidated list having electronic notification data for only the changed objects 154. Subsequently, the on-demand scanning service 134 can transmit the electronic notification to the client device 110, the client device 160, or both via the network 120. The user 102, the user 104, or both can use the client device 110, the client device 160, or both, respectively, to view the electronic notification and gain insight into which of the objects 152 have been changed since the last scanning run without having to sift through redundant notifications (e.g., for objects that were updated multiple times; for objects that were added, updated multiple times, and then deleted) or irrelevant notifications (e.g., for objects at subdirectories that are not of interest).

In some aspects, the system 100 described herein significantly improves the state of the art from previous systems because it provides enhanced techniques for performing on-demand scanning for changes in objects stored in cloud-based object storage systems. As a result, the computing costs (e.g., processor usage, memory usage, etc.) of the system 100 can be reduced substantially by substantially eliminating duplicate, redundant, or irrelevant notifications. Further, the efficiency and effectiveness of the system 100 can be increased substantially by allowing for independent scanning either at a root level or at a leaf level of a tree-based structure of the cloud-based object storage system 150.

Figure 2:
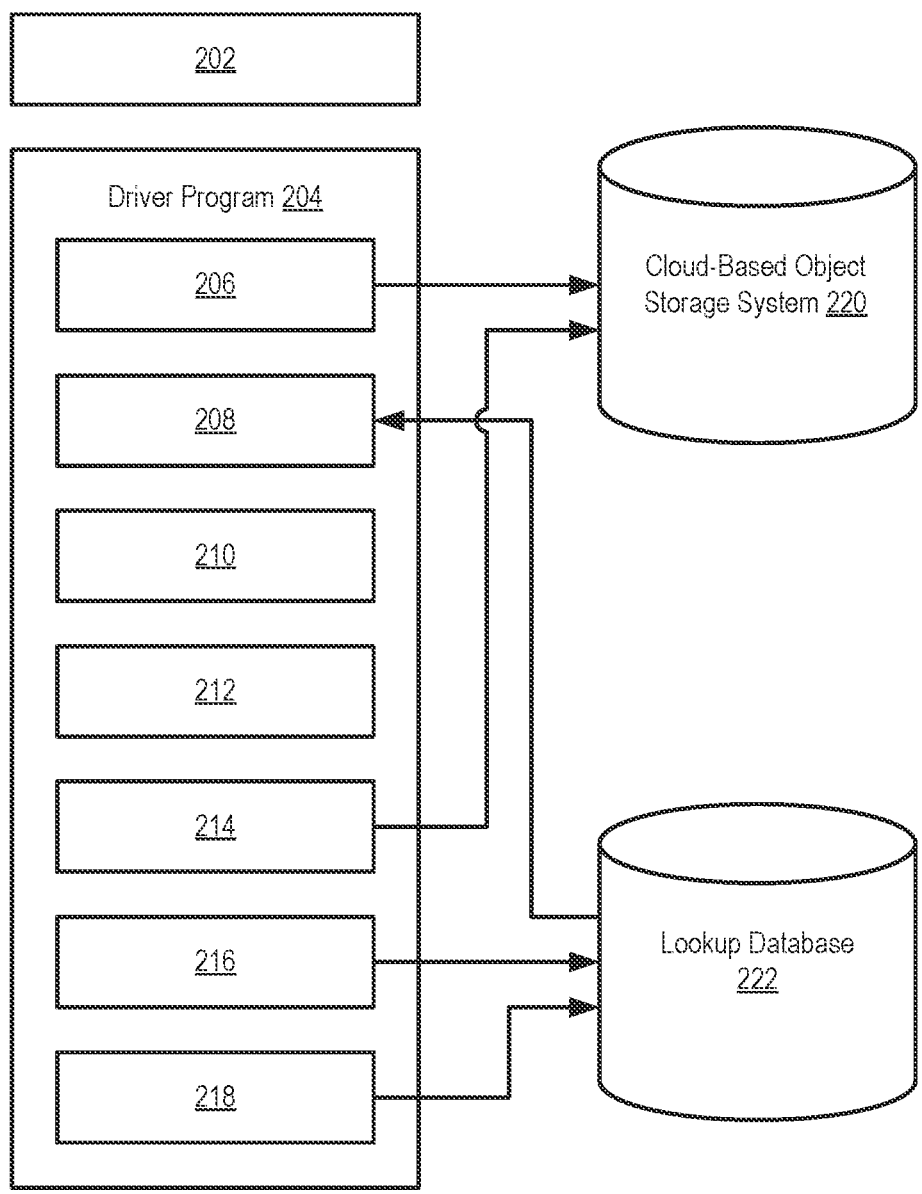
FIG. 2 illustrates another example system for providing on-demand scanning of objects stored in a cloud-based object storage system according to some embodiments.

FIG. 2 shows portions of a process flow 200 for providing on-demand scanning for changes in objects stored in a cloud-based object storage system according to some embodiments. The process flow 200 can be performed by a computing system, such as the system 100 described with reference to FIG. 1, the driver program 204 described with reference to FIG. 2, the architecture 400 described with reference to FIG. 4, or a combination thereof. For example, the process flow 200 can provide an example of how the system 100, the driver program 204, the architecture 400, any other suitable computing system, or any combination thereof can operate. For the purposes of this example discussion of FIG. 2, it is to be understood that some or all of the driver program 204 is installed on the cloud server 130 (e.g., as a part of the on-demand scanning service 134).

At 202, the process flow 200 begins by initializing a driver program 204 on a cadence (e.g., daily, weekly, monthly). The driver program 204 can run on any suitable compute instance on the cloud, on premise, or on a local machine. The initializing the driver program 204 can be performed by, for example, the on-demand scanning service 134 of the cloud server 130.

At 206, the driver program 204 pulls a first list of objects and timestamps from a cloud-based object storage system 220. The cloud-based object storage system 220 can refer to cloud object storage offered by any cloud provider, such as Amazon S3.

At 208, the driver program 204 pulls lookup data from a lookup database 222. The lookup data can include a second list of objects and timestamps associated with previous runs of the driver program 204. The lookup data can be stored anywhere that is accessible by the driver program 204. For instance, the lookup data can be provided by a file-based storage, a relational or non-relational database, or cache-based systems running on cloud, on premise, or on the local compute instance.

At 210: the driver program 204 creates an empty processing list and an empty delete list.

At 212, the driver program 204 compares the first list of objects and timestamps pulled from the cloud-based object storage system 220 at 206 to the second list of objects and timestamps included in the lookup data pulled from the lookup database 222 at 208.

Based on the comparison, the driver program 204 identifies whether each of the objects in the first list is an unchanged, changed, new, or deleted object.

- A. Previously-changed objects and unchanged objects. The driver program 204 can add, to the delete list, every object in the first list pulled from the cloud-based object storage system 220 having a timestamp that is less than or equal to the timestamp for that object in the lookup data pulled from the lookup database 222.
- B. Newly-changed objects. The driver program 204 can add, to the processing list, every object in the first list pulled from the cloud-based object storage system 220 having a timestamp that is greater than the timestamp for that object in the lookup data pulled from the lookup database 222.
- C. Newly-added objects. The driver program 204 can add, to the processing list, every object in the first list pulled from the cloud-based object storage system 220 that does not have a corresponding entry in the lookup data pulled from the lookup database 222.
- D. Newly-deleted objects. The driver program 204 can add, to the delete list, every object in the lookup data pulled from the lookup database 222 that does not have a corresponding entry in the first list pulled from the cloud-based object storage system 220.

At 214, the driver program 204 pulls objects in the processing list from the cloud-based object storage system 220 for processing.

At 216, the driver program 204 inserts or updates the lookup data in the lookup database 222 with latest timestamps for objects in processing list.

At 218, the driver program 204 removes entries in the delete list from the lookup data. As a result, the driver program 204 discards the unchanged and deleted objects to minimize the reporting of redundant, obsolete, or otherwise irrelevant notifications to applications and/or user devices.

Figure 3:
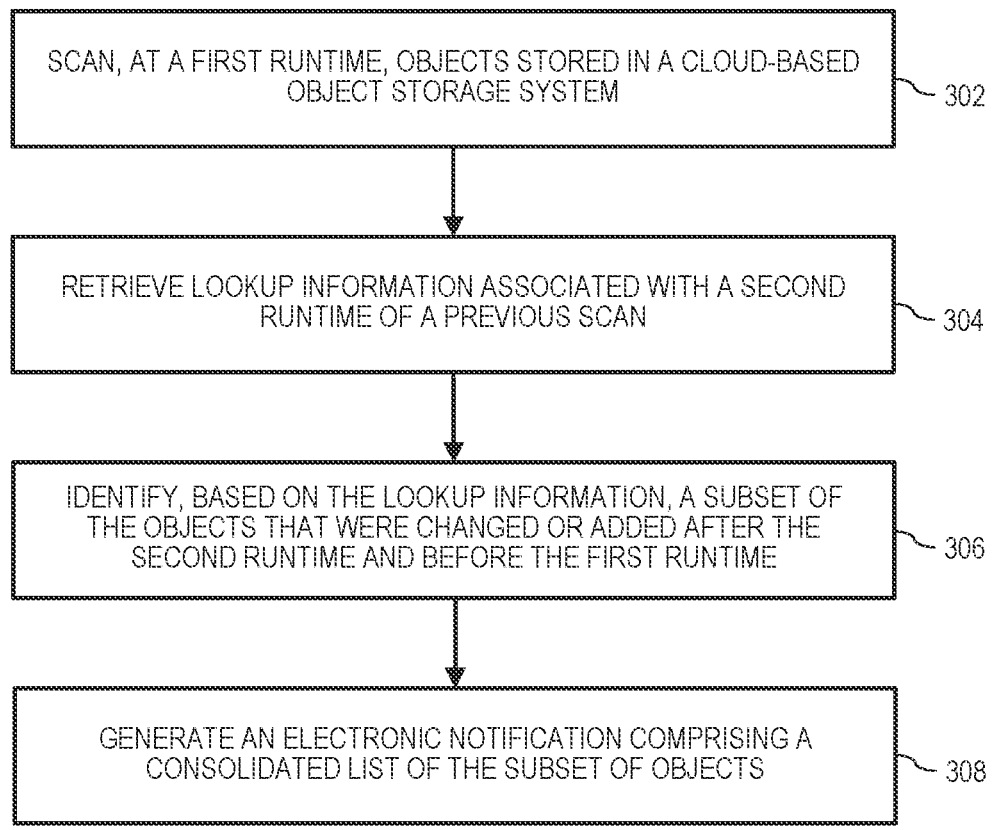
FIG. 3 illustrates an example method for providing on-demand scanning of objects stored in a cloud-based object storage system according to some embodiments.

FIG. 3 illustrates a method 300 of operating the system 100 or the process flow 200 to provide for on-demand scanning for changes in cloud-based object storage systems according to some embodiments. For example, the method 300 can indicate how the cloud server 130 operates (e.g., using the on-demand scanning service 134). Additionally or alternatively, the method 300 can indicate how the driver program 204 operates.

In several embodiments, operation 302 allows the cloud server 130 to scan, at a first runtime, objects 152 stored in a cloud-based object storage system 150.

In several embodiments, operation 304 allows the cloud server 130 to retrieve lookup information 142 associated with a second runtime of a previous scan (e.g., the last runtime before the first runtime). The lookup information 142 can include, for example, file-based lookup information generated by a file-based lookup system, cache memory-based lookup information generated by a cache memory-based lookup system, database-based lookup information generated by a database-based lookup system, any other suitable data or electronic information, or any combination thereof.

Optionally, in several embodiments, the objects 152 can be stored at a root level of a tree-based structure in the cloud-based object storage system 150. One or more optional operations can allow the cloud server 130 to scan, at the first runtime, the objects 152 stored at the root level of the tree-based structure in the cloud-based object storage system 150. The lookup information 142 can include timestamp information stored at the root level of the tree-based structure in the cloud-based object storage system 150. One or more optional operations can further allow the cloud server 130 to retrieve the lookup information 142 stored at the root level of the tree-based structure in the cloud-based object storage system 150 and associated with the second runtime of the previous scan.

Optionally, in several embodiments, the objects 152 can be stored at a leaf level of a tree-based structure in the cloud-based object storage system 150. One or more optional operations can allow the cloud server 130 to scan, at the first runtime, the objects 152 stored at the leaf level of the tree-based structure in the cloud-based object storage system 150. The lookup information 142 can include timestamp information stored at the leaf level of the tree-based structure in the cloud-based object storage system 150. One or more optional operations can further allow the cloud server 130 to retrieve the lookup information 142 stored at the leaf level of the tree-based structure in the cloud-based object storage system 150 and associated with the second runtime of the previous scan.

In several embodiments, operation 306 allows the cloud server 130 to identify, based on the lookup information 142, a subset of the objects 152 that were modified or added after the second runtime and before the first runtime. The subset of the objects 152 can include, for example, the changed objects 154 (e.g., newly changed objects and newly added objects). Optionally, the lookup information 142 can include a maximum timestamp of the second runtime of the previous scan, and the cloud server 130 can identify the subset of the objects 152 by identifying, based on the lookup information 142, the subset of the objects 152 that were changed after the maximum timestamp of the previous scan.

In several embodiments, operation 308 allows the cloud server 130 to generate an electronic notification comprising a consolidated list of the subset of the objects 152. Optionally, the subset of the objects 152 can be a first subset of the objects 152, and the cloud server 130 can generate the electronic notification by discarding electronic notification data for a second subset of the objects 152 that were changed before the second runtime and not changed after the second runtime or that were deleted after the second runtime and before the first runtime. The second subset of the objects 152 can include, for example, the changed objects 156 (e.g., previously changed objects, unchanged objects, and newly deleted objects).

Figure 4:
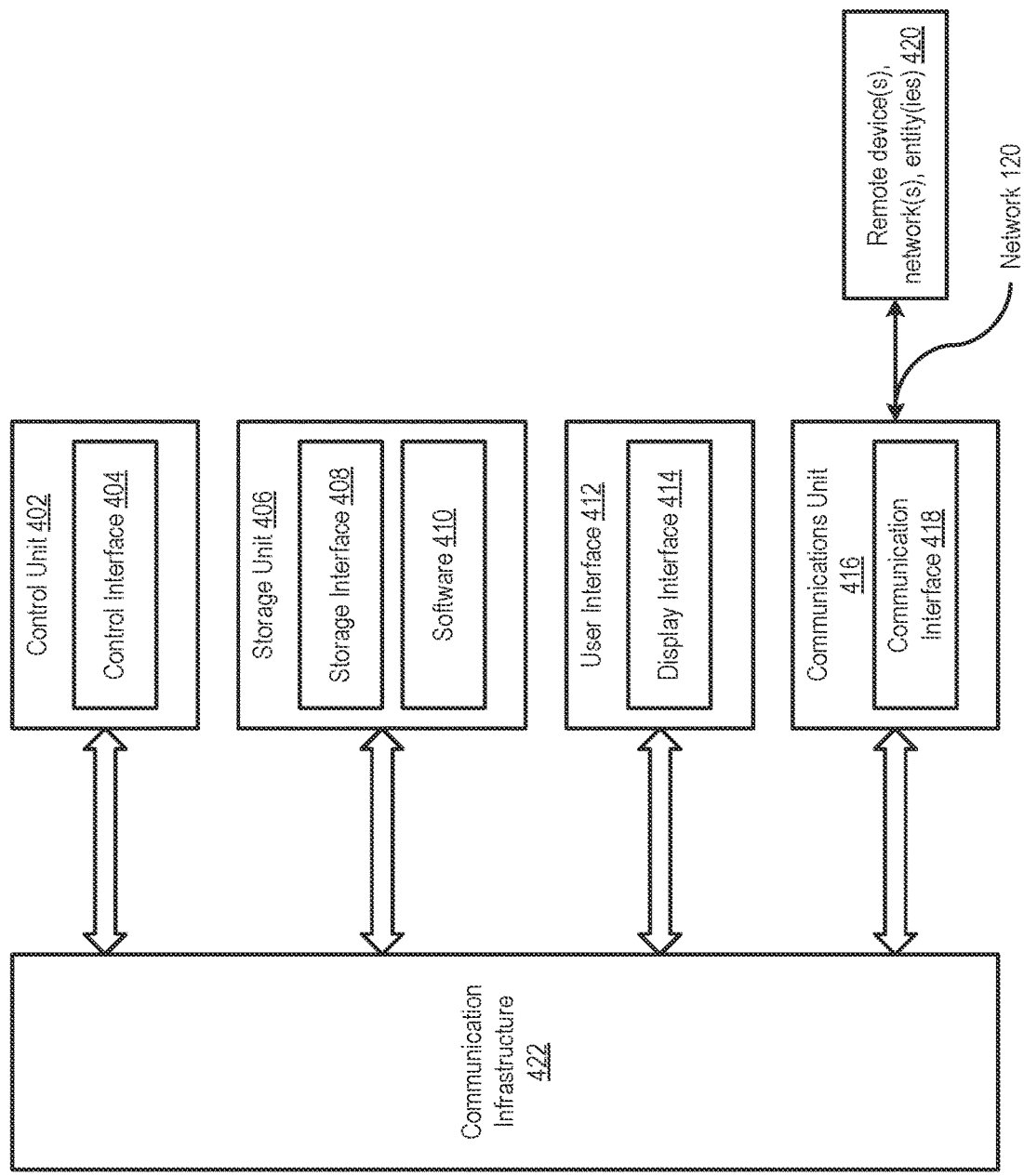
FIG. 4 illustrates an example architecture of components implementing an example system for providing on-demand scanning of objects stored in a cloud-based object storage system according to some embodiments.

FIG. 4 is an architecture 400 of components implementing the system 100 according to some embodiments. The components can be implemented by any of the devices described with reference to the system 100, such as the client device 110, the client device 160, the cloud server 130, the lookup database 140, the cloud-based object storage system 150, or a combination thereof. The components can be further implemented by any of the devices described with reference to the process flow 200, such as the driver program 204, the cloud-based object storage system 220, the lookup database 222, or a combination thereof.

In several embodiments, the components can include a control unit 402, a storage unit 406, a communication unit 416, and a user interface 412. The control unit 402 can include a control interface 404. The control unit 402 can execute a software 410 (e.g., the application 112, the authentication module 114, the application 162, the authentication module 164, the authentication service 132, the on-demand scanning service 134, or a combination thereof) to provide some or all of the machine intelligence described with reference to the system 100. In another example, the control unit 402 can execute the software 410 (e.g., the driver program 204) to provide some or all of the machine intelligence described with reference to the process flow 200.

The control unit 402 can be implemented in a number of different ways. For example, the control unit 402 can be a processor, an application specific integrated circuit (ASIC), an embedded processor, a microprocessor, a hardware control logic, a hardware finite state machine (FSM), a digital signal processor (DSP), a field programmable gate array (FPGA), or a combination thereof.

The control interface 404 can be used for communication between the control unit 402 and other functional units or devices of the system 100 or the process flow 200. The control interface 404 can also be used for communication that is external to the functional units or devices of the system 100 or the process flow 200. The control interface 404 can receive information from the functional units or devices of the system 100, the process flow 200, or the remote devices 420, or can transmit information to the functional units or devices of the system 100, the process flow 200, or the remote devices 420. The remote devices 420 can refer to units or devices external to the system 100 or the process flow 200.

The control interface 404 can be implemented in different ways and can include different implementations depending on which functional units or devices of the system 100, the process flow 200, or the remote devices 420 are being interfaced with the control unit 402. For example, the control interface 404 can be implemented with a pressure sensor, an inertial sensor, a microelectromechanical system (MEMS), optical circuitry, waveguides, wireless circuitry, wireline circuitry to attach to a bus, an API, or a combination thereof. The control interface 404 can be connected to a communication infrastructure 422, such as a bus, to interface with the functional units or devices of the system 100, the process flow 200, or the remote devices 420.

The storage unit 406 can store the software 410. For illustrative purposes, the storage unit 406 is shown as a single element, although it is understood that the storage unit 406 can be a distribution of storage elements. Also for illustrative purposes, the storage unit 406 is shown as a single hierarchy storage system, although it is understood that the storage unit 406 can be in a different configuration. For example, the storage unit 406 can be formed with different storage technologies forming a memory hierarchical system including different levels of caching, main memory, rotating media, or off-line storage. The storage unit 406 can be a volatile memory, a nonvolatile memory, an internal memory, an external memory, or a combination thereof. For example, the storage unit 406 can be a nonvolatile storage such as nonvolatile random access memory (NVRAM), Flash memory, disk storage, or a volatile storage such as static random access memory (SRAM) or dynamic random access memory (DRAM).

The storage unit 406 can include a storage interface 408. The storage interface 408 can be used for communication between the storage unit 406 and other functional units or devices of the system 100 or the process flow 200. The storage interface 408 can also be used for communication that is external to the system 100 or the process flow 200. The storage interface 408 can receive information from the other functional units or devices of the system 100, the process flow 200, or the remote devices 420, or can transmit information to the other functional units or devices of the system 100, the process flow 200, or the remote devices 420. The storage interface 408 can include different implementations depending on which functional units or devices of the system 100, the process flow 200, or the remote devices 420 are being interfaced with the storage unit 406. The storage interface 408 can be implemented with technologies and techniques similar to the implementation of the control interface 404.

The communication unit 416 can enable communication to devices, components, modules, or units of the system 100, the process flow 200, or the remote devices 420. For example, the communication unit 416 can permit the system 100 to communicate between the client device 110, the client device 160, the cloud server 130, the lookup database 140, the cloud-based object storage system 150, or a combination thereof. In another example, the communication unit 416 can permit the process flow 200 to communicate between the driver program 204, the cloud-based object storage system 220, the lookup database 222, or a combination thereof. The communication unit 416 can further permit the devices of the system 100 or the process flow 200 to communicate with the remote devices 420 (e.g., an attachment, a peripheral device, or a combination thereof) through the network 120.

The network 120 can span and represent a variety of networks and network topologies and can include wireless communication, wired communication, optical communication, ultrasonic communication, or a combination thereof. Satellite communication, cellular communication, Bluetooth, IrDA, Wi-Fi, and WiMAX are examples of wireless communication that can be included in the network 120. Cable, Ethernet, DSL, fiber optic lines, FTTH, and POTS are examples of wired communication that can be included in the network 120. The network 120 can also traverse a number of network topologies and distances. For example, the network 120 can include direct connection, PAN, LAN, MAN, WAN, or a combination thereof.

The communication unit 416 can also function as a communication hub allowing the system 100 or the process flow 200 to function as part of the network 120 and not be limited to be an end point or terminal unit to the network 120. The communication unit 416 can include active and passive components, such as microelectronics or an antenna, for interaction with the network 120.

The communication unit 416 can include a communication interface 418. The communication interface 418 can be used for communication between the communication unit 416 and other functional units or devices of the system 100, the process flow 200, or the remote devices 420. The communication interface 418 can receive information from the other functional units or devices of the system 100, the process flow 200, or the remote devices 420, or can transmit information to the other functional units or devices of the system 100, the process flow 200, or the remote devices 420. The communication interface 418 can include different implementations depending on which functional units or devices are being interfaced with the communication unit 416. The communication interface 418 can be implemented with technologies and techniques similar to the implementation of the control interface 404.

The user interface 412 can present information generated by the system 100 or the process flow 200. In several embodiments, the user interface 412 allows a user to interface with the devices of the system 100, the process flow 200, or the remote devices 420. The user interface 412 can include an input device and an output device. Examples of the input device of the user interface 412 can include a keypad, buttons, switches, touchpads, soft-keys, a keyboard, a mouse, or any combination thereof to provide data and communication inputs. Examples of the output device can include a display interface 414. The control unit 402 can operate the user interface 412 to present information generated by the system 100 or the process flow 200. The control unit 402 can also execute the software 410 to present information generated by the system 100 or the process flow 200, or to control other functional units of the system 100 or the process flow 200. The display interface 414 can be any graphical user interface such as a display, a projector, a video screen, or any combination thereof.

The detailed description and embodiments of the systems, methods, and non-transitory computer readable media disclosed herein are not intended to be exhaustive or to limit the disclosed embodiments to the precise forms disclosed above. While specific examples for systems, methods, and non-transitory computer readable media are described herein for illustrative purposes, various equivalent modifications are possible within the scope of the disclosed embodiments, as those skilled in the relevant art will recognize. For example, while processes and methods are presented in a given order, alternative implementations may perform routines having steps, or employ systems having processes or methods, in a different order, and some processes or methods may be deleted, moved, added, subdivided, combined, or modified to provide alternative or sub-combinations. Each of these processes or methods may be implemented in a variety of different ways. Also, while processes or methods are at times shown as being performed in series, these processes or blocks may instead be performed or implemented in parallel, or may be performed at different times.

The systems, methods, and non-transitory computer readable media disclosed herein are cost-effective, highly versatile, and accurate, and may be implemented by adapting components for ready, efficient, and economical manufacturing, application, and utilization. Another important aspect of embodiments of the present disclosure is that they valuably support and service the trend of reducing costs, simplifying systems, and/or increasing system performance.

These and other valuable aspects of the embodiments of the present disclosure consequently further the state of the technology to at least the next level. While the disclosed embodiments have been described as the best mode of implementing the systems, methods, and non-transitory computer readable media disclosed herein, it is to be understood that many alternatives, modifications, and variations will be apparent to those skilled in the art in light of the descriptions herein. Accordingly, it is intended to embrace all such alternatives, modifications, and variations that fall within the scope of the included claims. All matters set forth herein or shown in the accompanying drawings are to be interpreted in an illustrative and non-limiting sense. Accordingly, the disclosure is not to be restricted except in light of the attached claims and their equivalents.

What is claimed is:

1. A computer-implemented method, comprising:
    obtaining, by a driver program executing on one or more computing devices, a first list of objects from a cloud-based object storage system at a runtime;
    retrieving, by the driver program, lookup information comprising a second list of objects associated with a previous runtime of the driver program from a lookup database;
    identifying, by the driver program and based on a comparison of the first list of objects to the second list of objects, a first subset of objects that were changed or added to the cloud-based object storage system after the previous runtime and before the runtime and a second subset of objects that were unchanged or deleted from the cloud-based object storage system after the previous runtime and before the runtime;
    updating, by the driver program, the lookup information in the lookup database with a latest timestamp for each object in the first subset of objects; and
    removing, by the driver program, each object in the second subset of objects from the lookup information in the lookup database.

2. The computer-implemented method of claim 1, further comprising:
    generating, by the driver program, an electronic notification comprising a consolidated list of newly changed objects by discarding electronic notification data for the second subset of objects from electronic notification data generated for the first subset of objects and the second subset of objects.

3. The computer-implemented method of claim 1, wherein:
    the second list of objects in the lookup information comprises a maximum timestamp of the previous runtime of the driver program; and
    wherein identifying the first subset of objects comprises:
        identifying, by the driver program, one or more objects in the first list of objects that have a timestamp greater than the maximum timestamp for that object in the second list of objects; and
        identifying, by the driver program, one or more objects in the first list of objects that do not have a corresponding entry in the second list of objects.

4. The computer-implemented method of claim 3, wherein identifying the second subset of objects comprises:
    identifying, by the driver program, one or more objects in the first list of objects that have a timestamp less than or equal to the maximum timestamp for that object in the second list of objects; and
    identifying, by the driver program, one or more objects in the second list of objects that do not have a corresponding entry in the first list of objects.

5. The computer-implemented method of claim 1, wherein the lookup information in the lookup database comprises one of:
    file-based lookup information generated by a file-based lookup system;
    cache memory-based lookup information generated by a cache memory-based lookup system; and
    database-based lookup information generated by a database-based lookup system.

6. The computer-implemented method of claim 1, wherein:
    the objects are stored at a root level of a tree-based structure in the cloud-based object storage system; and
    the lookup information comprises timestamp information stored at the root level of the tree-based structure.

7. The computer-implemented method of claim 1, wherein:
    the objects are stored at a leaf level of a tree-based structure in the cloud-based object storage system; and
    the lookup information comprises timestamp information stored at the leaf level of the tree-based structure.

8. A non-transitory computer-readable medium storing instructions for causing a computing device to perform operations, the operations comprising:
    obtaining a first list of objects from a cloud-based object storage system at a runtime of a driver program;
    retrieving lookup information comprising a second list of objects associated with a previous runtime of the driver program from a lookup database;

identifying, based on a comparison of the first list of objects to the second list of objects, a first subset of objects that were changed or added to the cloud-based object storage system after the previous runtime and before the runtime and a second subset of objects that were unchanged or deleted from the cloud-based object storage system after the previous runtime and before the runtime;

updating the lookup information in the lookup database with a latest timestamp for each object in the first subset of objects; and removing each object in the second subset of objects from the lookup information in the lookup database.

9. The non-transitory computer-readable medium of claim 8, the operations further comprising:

generating an electronic notification comprising a consolidated list of newly changed objects by discarding electronic notification data for the second subset of objects from electronic notification data generated for the first subset of objects and the second subset of objects.

10. The non-transitory computer-readable medium of claim 8, wherein:

the second list of objects in the lookup information comprises a maximum timestamp of the previous runtime of the driver program; and wherein identifying the first subset of objects comprises:
identifying one or more objects in the first list of objects that have a timestamp greater than the maximum timestamp for that object in the second list of objects; and
identifying one or more objects in the first list of objects that do not have a corresponding entry in the second list of objects.

11. The non-transitory computer-readable medium of claim 10, wherein identifying the second subset of objects comprises:

identifying one or more objects in the first list of objects that have a timestamp less than or equal to the maximum timestamp for that object in the second list of objects; and identifying one or more objects in the second list of objects that do not have a corresponding entry in the first list of objects.

12. The non-transitory computer-readable medium of claim 8, wherein the lookup information in the lookup database comprises one of:

file-based lookup information generated by a file-based lookup system;

cache memory-based lookup information generated by a cache memory-based lookup system; and database-based lookup information generated by a database-based lookup system.

13. The non-transitory computer-readable medium of claim 8, wherein:

the objects are stored at a root level of a tree-based structure in the cloud-based object storage system; and the lookup information comprises timestamp information stored at the root level of the tree-based structure.

14. The non-transitory computer-readable medium of claim 8, wherein:

the objects are stored at a leaf level of a tree-based structure in the cloud-based object storage system; and the lookup information comprises timestamp information stored at the leaf level of the tree-based structure.

15. A computing system, comprising:
at least one processor; and
a memory storing instructions thereon that, when executed by the at least one processor, cause the at least one processor to perform operations comprising:

obtaining a first list of objects from a cloud-based object storage system at a runtime of a driver program;

retrieving lookup information comprising a second list of objects associated with a previous runtime of the driver program from a lookup database;

identifying, based on a comparison of the first list of objects to the second list of objects, a first subset of objects that were changed or added to the cloud-based object storage system after the previous runtime and before the runtime and a second subset of objects that were unchanged or deleted from the cloud-based object storage system after the previous runtime and before the runtime;

updating the lookup information in the lookup database with a latest timestamp for each object in the first subset of objects; and removing each object in the second subset of objects from the lookup information in the lookup database.

16. The computing system of claim 15, the operations further comprising:

generating an electronic notification comprising a consolidated list of newly changed objects by discarding electronic notification data for the second subset of objects from electronic notification data generated for the first subset of objects and the second subset of objects.

17. The computing system of claim 15, wherein:
the second list of objects in the lookup information comprises a maximum timestamp of the previous runtime of the driver program; and wherein identifying the first subset of objects comprises:
identifying one or more objects in the first list of objects that have a timestamp greater than the maximum timestamp for that object in the second list of objects; and
identifying one or more objects in the first list of objects that do not have a corresponding entry in the second list of objects.

18. The computing system of claim 17, wherein identifying the second subset of objects comprises:

identifying one or more objects in the first list of objects that have a timestamp less than or equal to the maximum timestamp for that object in the second list of objects; and identifying one or more objects in the second list of objects that do not have a corresponding entry in the first list of objects.

19. The computing system of claim 15, wherein:
the objects are stored at a root level of a tree-based structure in the cloud-based object storage system; and
the lookup information comprises timestamp information stored at the root level of the tree-based structure.

20. The computing system of claim 15, wherein:
the objects are stored at a leaf level of a tree-based structure in the cloud-based object storage system; and
the lookup information comprises timestamp information stored at the leaf level of the tree-based structure.

* * * * *